United States Patent
Swart et al.

(10) Patent No.: US 12,486,816 B2
(45) Date of Patent: *Dec. 2, 2025

(54) ENGINE CONTROL SYSTEMS AND METHODS FOR STARTING AN ENGINE

(71) Applicant: PACCAR Inc, Bellevue, WA (US)

(72) Inventors: Charles Wayne Reinhardt Swart, Bellingham, WA (US); Stephen Anthony Ciatti, Bellingham, WA (US); Nick Hertlein, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,221

(22) Filed: Jun. 5, 2024

(65) Prior Publication Data

US 2025/0084802 A1 Mar. 13, 2025

Related U.S. Application Data

(63) Continuation of application No. 18/463,076, filed on Sep. 7, 2023, now Pat. No. 12,037,956.

(51) Int. Cl.
*F02D 41/06* (2006.01)
*F02D 13/02* (2006.01)
(Continued)

(52) U.S. Cl.
CPC ....... *F02D 41/062* (2013.01); *F02D 13/0215* (2013.01); *F02D 41/3076* (2013.01);
(Continued)

(58) Field of Classification Search
CPC ............... F02D 41/062; F02D 13/0215; F02D 41/3076; F02D 2200/021; F02D 2200/101; F02P 5/1504

See application file for complete search history.

(56) References Cited

U.S. PATENT DOCUMENTS

| 4,641,613 A | 2/1987 | Delesalle |
| 6,637,394 B2 | 10/2003 | Marshall et al. |

(Continued)

FOREIGN PATENT DOCUMENTS

CN 104819022 B 9/2023

OTHER PUBLICATIONS

Galindo, Jose et al., EGR cylinder deactivation strategy to accelerate the warm-up and restart processes in a Diesel engine operating at cold conditions, International Journal of Engine Research, vol. 23, Issue 4, Apr. 2022, 20 pages.

(Continued)

*Primary Examiner* — Sizo B Vilakazi

(74) *Attorney, Agent, or Firm* — Womble Bond Dickinson (US) LLP

(57) ABSTRACT

An engine control system for a vehicle includes at least one processor; and a memory, operatively connected to the at least one processor and storing instructions that, when executed by the at least one processor and in response to receiving an engine start signal, cause the engine control system to perform a method, the method including causing a crankshaft of an engine of the vehicle to begin to rotate and to rotate through a first plurality of rotations, and causing, for each combustion chamber of at least one combustion chamber of the engine, an exhaust valve of the combustion chamber to remain in an opened position while the crankshaft rotates through the first plurality of rotations and prior to fuel being injected into the combustion chamber.

15 Claims, 9 Drawing Sheets

(51) Int. Cl.
*F02D 41/30* (2006.01)
*F02P 5/15* (2006.01)

(52) U.S. Cl.
CPC ...... *F02P 5/1504* (2013.01); *F02D 2200/021* (2013.01); *F02D 2200/101* (2013.01)

(56) References Cited

U.S. PATENT DOCUMENTS

| | | | |
|---|---|---|---|
| 9,163,568 B2 * | 10/2015 | Sczomak | F02D 41/3058 |
| 9,708,993 B2 * | 7/2017 | Glugla | F02D 41/0087 |
| 10,563,566 B2 * | 2/2020 | Brinkmann | F01P 7/165 |
| 11,306,672 B2 * | 4/2022 | Younkins | F01N 3/2066 |
| 11,371,443 B2 * | 6/2022 | Kato | F02M 59/20 |
| 11,391,222 B2 * | 7/2022 | Kato | F02M 59/02 |
| 12,037,956 B1 * | 7/2024 | Swart | F02P 5/1504 |
| 2010/0294224 A1 | 11/2010 | Svensson | |
| 2020/0325833 A1 * | 10/2020 | Kato | F02D 41/009 |
| 2023/0041675 A1 * | 2/2023 | Choi | B60W 20/20 |

OTHER PUBLICATIONS

Jääskeläinen, Hannu, Cylinder Deactivation for Diesel Engines, DieselNet Technology Guide » Exhaust Gas Thermal Management, Aug. 2020, 4 pages.

Mortons on the Move, Is a Cold Start Detrimental to My Vehicle's Engine?, https://www.mortonsonthemove.com/cold-start/, Dec. 24, 2022, 10 pages.

Thomas, Phillip, Diesel engines could finally get cylinder deactivation tech, thanks to Cummins and Tula partnership, Hagerty, https://www.hagerty.com/media/news/diesel-engines-could-finally-get-cylinder-deactivation-tech-thanks-to-cummins-and-tula-partnership/, Apr. 22, 2020, 6 pages.

Extended European Search Report for European Patent Application No. 24194025.3 mailed Feb. 17, 2025, 9 pages.

Examination Report for European Patent Application No. 24194025.3 mailed Jul. 21, 2025, 4 pages.

* cited by examiner

400

401 — Transmitting, by at least one processor of an engine controller, one or more first engine control signals that, when received by an engine, cause a crankshaft of the engine to begin to rotate and to rotate through a first plurality of rotations, cause each combustion chamber of a first set of combustion chambers of the engine to be operated in a valve open mode while the crankshaft rotates through the first plurality of rotations, and cause each combustion chamber of a second set of combustion chambers of the engine to be operated in a normal non-firing mode while the crankshaft rotates through the first plurality of rotations.

402 — Transmitting, by the at least one processor and after a rotational speed of the crankshaft exceeds a threshold speed, one or more second engine control signals that, when received by the engine, cause each combustion chamber of the first set of combustion chambers to be operated in a cylinder deactivation mode while the crankshaft rotates through a second plurality of rotations, and cause each combustion chamber of the second set of combustion chambers to operate in a normal firing mode.

403 — Transmitting, by the at least one processor and after a temperature of the engine exceeds a temperature threshold, one or more third engine control signals that, when received by the engine, cause each combustion chamber of the engine to be operated in a normal firing mode.

FIG. 9

ENGINE CONTROL SYSTEMS AND METHODS FOR STARTING AN ENGINE

CROSS-REFERENCE TO RELATED APPLICATIONS

This application is a continuation of U.S. patent application Ser. No. 18/463,076, filed on Sep. 7, 2023, the entire content of which is incorporated herein by reference.

BACKGROUND

The present disclosure relates to engine control systems and methods for aiding in the start of an engine at low temperatures. When a diesel engine of a vehicle is attempted to be started while at low temperatures, diesel fuel injected into a combustion chamber of the engine may fail to ignite during a combustion cycle of the engine. This can result when insufficient amounts of the diesel fuel evaporates within the combustion chamber due to a temperature of the air and the diesel fuel in the combustion chamber being insufficiently low. When the diesel fuel fails to ignite, the diesel fuel may be ejected into the atmosphere during an exhaust stroke of the engine, which can contribute to pollution. The vehicle's battery may also provide power to control various operations of the engine before internal combustion occurs and, thus, failure of the diesel fuel to ignite may deplete the vehicle's battery while starting the engine. It is with respect to this technical environment that aspects of the present disclosure are directed.

Statements made in this background section are provided solely for purposes of providing background information relating to the present disclosure and, thus, are not admissions or prior art.

SUMMARY

According to an aspect, the technology relates to an engine control system for a vehicle, including at least one processor; and a memory, operatively connected to the at least one processor and storing instructions that, when executed by the at least one processor and in response to receiving an engine start signal, cause the engine control system to perform a method, the method including causing a crankshaft of an engine of the vehicle to begin to rotate and to rotate through a first plurality of rotations, and causing, for each combustion chamber of at least one combustion chamber of the engine, an exhaust valve of the combustion chamber to remain in an opened position while the crankshaft rotates through the first plurality of rotations and prior to fuel being injected into the combustion chamber.

In some examples, the at least one combustion chamber includes all combustion chambers of the engine. In some examples, the at least one combustion chamber includes a first set of combustion chambers of the engine, and the method further includes causing, for each combustion chamber of a second set of combustion chambers of the engine, the exhaust valve of the combustion chamber to open and close while the crankshaft rotates through the first plurality of rotations and prior to fuel being injected into the combustion chamber. In some examples, the method further includes causing, after a speed of the crankshaft exceeds a threshold speed and for each combustion chamber of a first set of combustion chambers of the engine, the exhaust valve of the combustion chamber and an intake valve of the combustion chamber to both be closed while the crankshaft rotates through a second plurality of rotations and prior to fuel being injected into the combustion chamber. In some examples, the method further includes causing, for each of a second set of combustion chambers of the engine and while the crankshaft rotates through the second plurality of rotations, fuel to be injected into the combustion chamber and ignited inside the combustion chamber. In some examples, the first plurality of rotations includes 10 or more rotations. In some examples, the method includes transmitting, by the at least one processor, one or more engine control signals to control the crankshaft and the exhaust valve of each combustion chamber of the at least one combustion chamber. In some examples, the method includes causing, for each combustion chamber of the at least one combustion chamber, an intake valve of the combustion chamber to remain in a closed position while the crankshaft rotates through the first plurality of rotations.

According to an aspect, the technology relates to an engine control system, including at least one processor; and a memory, operatively connected to the at least one processor and storing instructions that, when executed by the at least one processor, cause the engine control system to perform a method, the method including transmitting, by the at least one processor, one or more engine control signals to cause a crankshaft of an engine to rotate through a first plurality of rotations, and cause, for each combustion chamber of at least one combustion chamber of the engine, an exhaust valve of the combustion chamber to remain in an opened position while the crankshaft rotates through the first plurality of rotations and without fuel being injected into the combustion chamber.

In some examples, the at least one combustion chamber includes all combustion chambers of the engine. In some examples, the at least one combustion chamber includes a first set of combustion chambers of the engine, and the engine includes a second set of combustion chambers different from the first set of combustion chambers. In some examples, the method includes the at least one processor transmitting the one or more engine control signals in response to receiving an engine start signal. In some examples, the one or more engine control signals cause after a speed of the crankshaft exceeds a threshold speed and for each combustion chamber of the at least one combustion chamber, the exhaust valve of the combustion chamber and an intake valve of the combustion chamber to remain closed while the crankshaft rotates through a second plurality of rotations; and while the crankshaft rotates through the second plurality of rotations and for each combustion chamber of the engine other than the at least one combustion chamber, fuel to be injected into the combustion chamber and ignited inside the combustion chamber. In some examples, the one or more engine control signals cause, after the crankshaft rotates through the second plurality of rotations and for each combustion chamber of the engine, fuel to be injected into the combustion chamber of the engine and ignited inside the combustion chamber.

According to an aspect, the technology relates to an engine control system for a vehicle, including at least one processor; and a memory, operatively connected to the at least one processor and storing instructions that, when executed by the at least one processor, cause the engine control system to perform a method, the method including transmitting, by the at least one processor, one or more engine control signals to cause a crankshaft of an engine of the vehicle to begin to rotate and to rotate through a first plurality of rotations, and cause, for each combustion chamber of at least one combustion chamber of the engine, a valve of the combustion chamber to remain in an opened position while the crankshaft rotates through the first plurality of rotations.

In some examples, the at least one combustion chamber includes all combustion chambers of the vehicle. In some examples, the one or more engine control signals do not cause fuel to be injected into each combustion chamber of the at least one combustion chamber while the crankshaft rotates through the first plurality of rotations. In some examples, the one or more engine control signals cause after the crankshaft rotates through the first plurality of rotations and for each combustion chamber of the at least one combustion chamber, the valve of the combustion chamber to remain open while the crankshaft rotates through a second plurality of rotations and prior to fuel being injected into the combustion chamber; for each combustion chamber of the engine other than the at least one combustion chamber, a valve to open and close while the crankshaft rotates through the second plurality of rotations and prior to fuel being injected into the combustion chamber. In some examples, the valve is an exhaust valve. In some examples, the one or more engine control signals cause, for each of the at least one combustion chamber, an intake valve of the combustion chamber to remain in an opened position while the crankshaft rotates through the first plurality of rotations.

This summary section describes some features of non-limiting and non-exhaustive examples of the present disclosure.

BRIEF DESCRIPTION OF THE DRAWINGS

The drawings, together with the specification, illustrate nonlimiting and non-exhaustive examples of the present disclosure.

FIG. 9 depicts processes of a method for starting an engine according to some examples.

DETAILED DESCRIPTION

Figure 1:
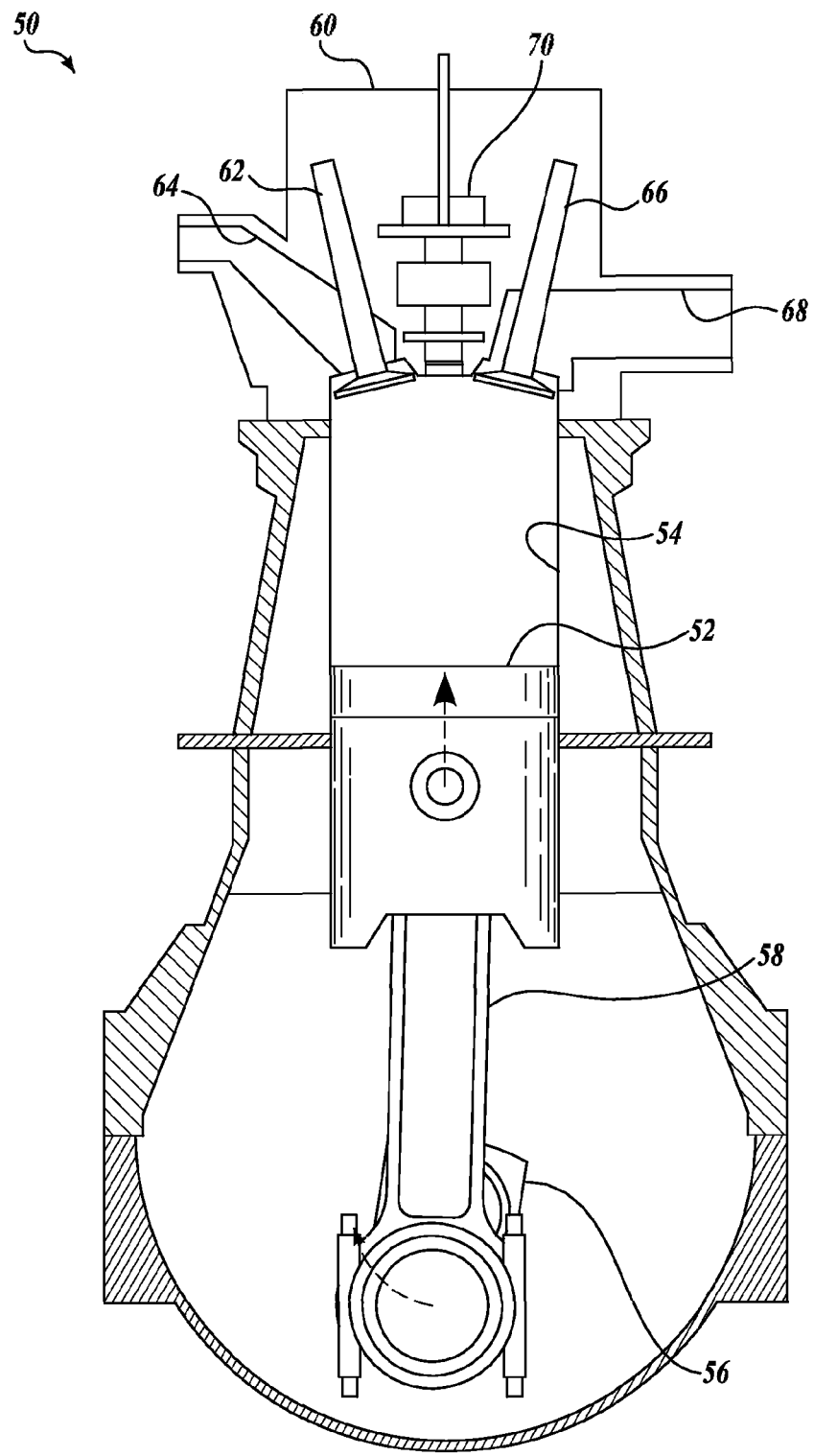
FIG. 1 depicts a schematic view of an example engine when a piston of the engine is at the beginning of a compression stroke.

Engine control systems and methods for starting an engine will now be described with reference to the drawings.

It will be understood that, although the terms "first", "second", "third", etc., may be used herein to describe various elements and processes, these elements and processes should not be limited by these terms. These terms are only used to distinguish one element or process from another element or process. Thus, a first element or process discussed below could be termed a second element or process, without departing from the spirit and scope of the present disclosure.

The terminology used herein is for the purpose of describing particular examples only and is not intended to be limiting of the present disclosure. As used herein, the singular forms "a", "an" and "the" are intended to include the plural forms as well, unless the context clearly indicates otherwise. It will be further understood that the terms "comprises," "comprising," "includes," and "including," when used in this specification, specify the presence of stated elements or processes, but do not preclude the presence or addition of one or more other elements or processes. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing examples of the present disclosure refers to "one or more examples of the present disclosure."

It will be understood that when an element is referred to as being "on", "connected to", "coupled to", another element or layer, it can be directly on, connected to, or coupled to the other element, or one or more intervening element(s) may be present. In contrast, when an element is referred to as being "directly on," "directly connected to", or "directly coupled to" another element or layer, there are no intervening elements present. Moreover, when one process is referred to as being "after" another process, the one process may occur immediately after the other process, or one or more intermediate processes may occur therebetween.

As used herein, the term "substantially" and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

FIGS. 1-4 show schematic views of an example diesel engine 50 as it moves through a four-stroke combustion cycle. However, the present disclosure is not limited to any particular engine configuration. For example, in some other examples, the engine may be a gasoline engine, and/or the combustion cycle may be a combustion cycle other than a four-stroke combustion cycle. The engine 50 may include one or more pistons (e.g., 1, 2, 4, 6, 8, or more pistons) and one or more respectively corresponding combustion chambers (e.g., combustion cylinders). In examples, the engine 50 may comprise an engine in a vehicle. In some implementations, the vehicle is a truck, such as a Class 8 truck. However, the methods and systems described herein can be used by vehicles of different types and/or sizes. For instance, aspects of the disclosed subject matter may have wide application and, therefore, may be suitable for use with other types of vehicles, such as passenger vehicles, buses, light, medium, and heavy-duty vehicles, motor homes, etc. Accordingly, the following descriptions and illustrations herein should be considered illustrative in nature and, thus, not limiting of the scope of the claimed subject matter. In one example, the vehicle in which the engine 50 is installed includes a cab mounted to a chassis supported by wheels of a front wheel assembly and, e.g., driving wheels of a rear wheel assembly. In some examples, the vehicle is articulatedly connected to a trailer by a trailer coupling, such as, for example, a "fifth wheel", to form a tractor-trailer combination.

A representative piston 52 of the engine 50 is shown in FIGS. 1-4 and is slidably disposed within a combustion chamber 54 (e.g., a combustion cylinder) of the engine 50. The piston 52 is coupled to a crankshaft 56 by a connecting rod 58 so that rotation of the crankshaft 56 reciprocates the piston 52 along the length of the combustion chamber 54. Movement of the piston 52 within the combustion chamber 54 changes the volume in the combustion chamber between the piston 52 and a cylinder head 60. An intake valve 62 is configured to controllably allow gases to enter the combustion chamber 54 through an intake channel 64, and an exhaust valve 66 is configured to controllably allow gases to exit the combustion chamber 54 through an exhaust channel 68.

For example, the intake valve 62 may be controllably positionable in at least an opened position, whereby gases are allowed to enter the combustion chamber 54 through the intake channel 64, and a closed position, whereby gases are blocked from entering the combustion chamber 54 through the intake channel 64. The position of the intake valve 62 may be controlled via one or more engine control signals received from an engine control system, for example, as disclosed herein. The exhaust valve 66 may be controllably positionable in at least an opened position, whereby gases are allowed to exit the combustion chamber 54 through the exhaust channel 68, and a closed position, whereby gases are blocked from exiting the combustion chamber 54 through the exhaust channel 68. The position of the exhaust valve 66 may be controlled via one or more engine signals received from the engine control system.

FIG. 1 shows the engine 50 when the piston 52 is at the beginning of a compression stroke. The piston 52 is at or near bottom dead center (BDC), and the intake valve 62 and the exhaust valve 64 are both closed. As the crankshaft 56 rotates in the indicated direction, the piston 52 is driven up through the combustion chamber 54, compressing the gas in the combustion chamber 54. Compressing the gas increases both the temperature and the pressure of the gas within the combustion chamber 54.

Figure 2:
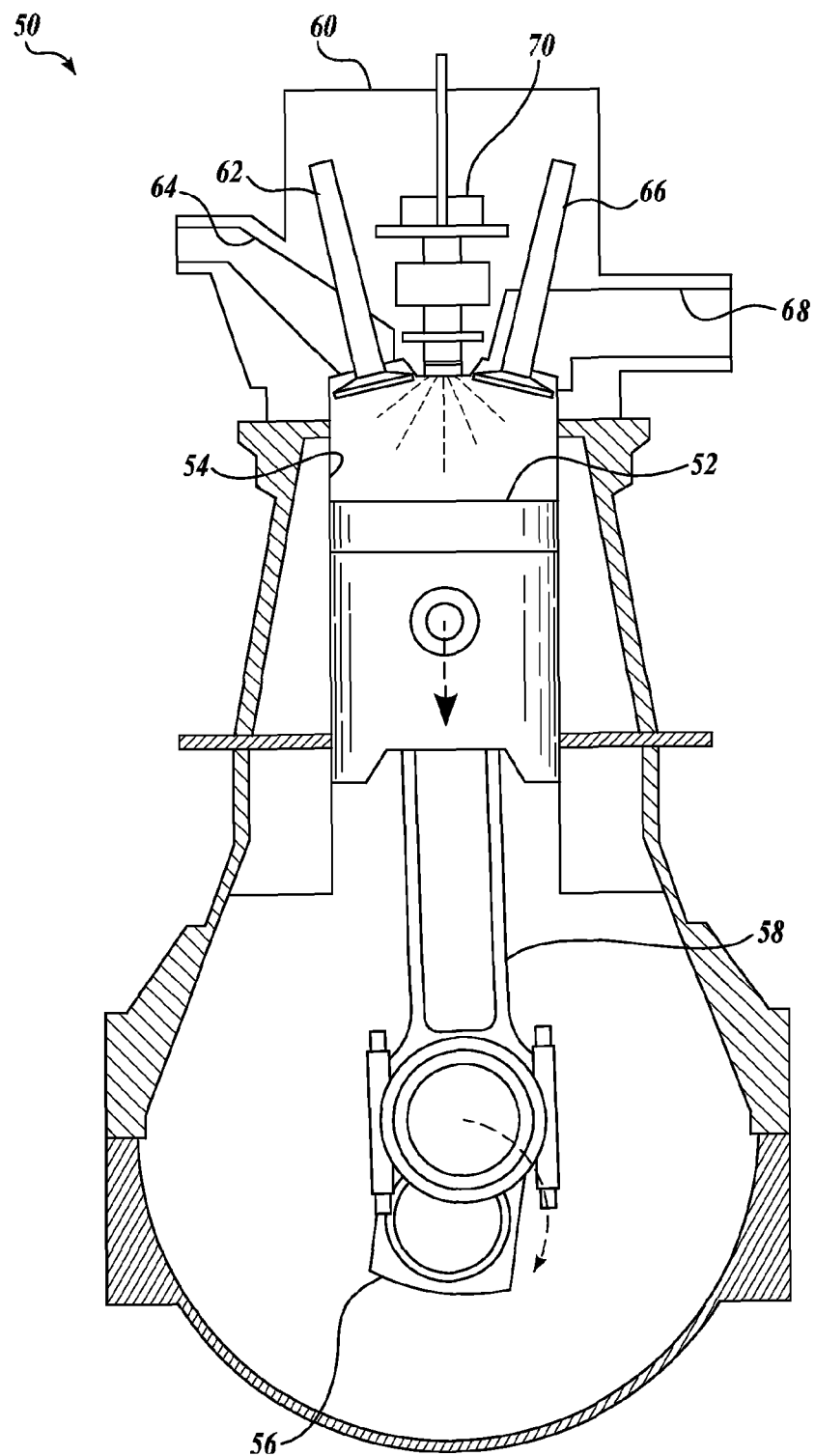
FIG. 2 depicts another schematic view of the engine of FIG. 1 when the piston is at the beginning of a power stroke.

FIG. 2 shows the engine 50 when the piston 52 is at the beginning of a power stroke. The piston 52 is just past top dead center (TDC), and the combustion chamber 54 is filled with hot, compressed air. The power stroke may begin when an injector 70 injects fuel into the combustion chamber 54. The heat of the compressed air in the combustion chamber 54 ignites the fuel, causing the gases in the combustion chamber 54 to rapidly expand. The rapid expansion of the gases drives the piston 52 downward, which rotates the crankshaft 56. The intake and exhaust valves 62 and 66 may both be closed for at least part of the power stroke.

Figure 3:
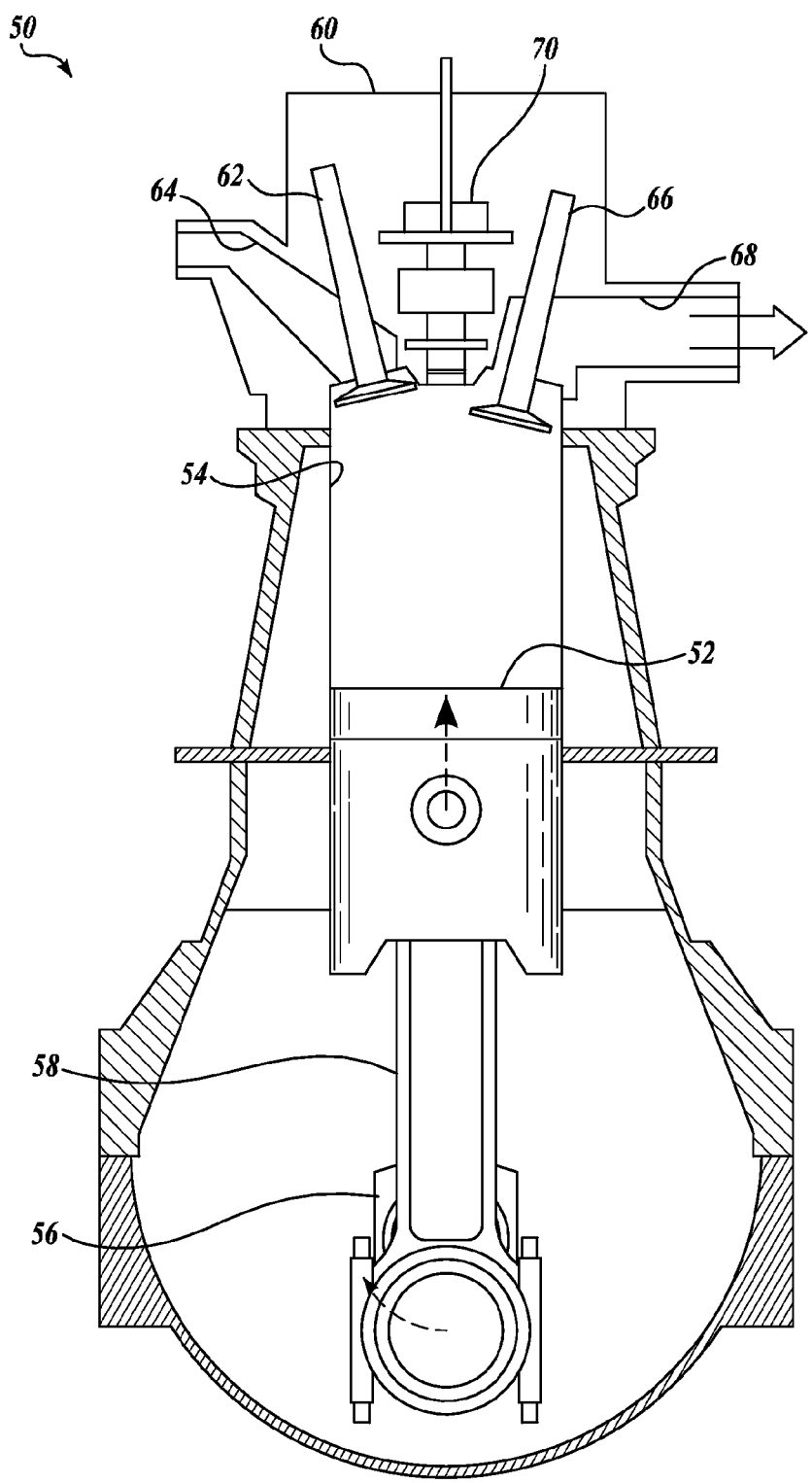
FIG. 3 depicts another schematic view of the engine of FIG. 1 when the piston is at the beginning of an exhaust stroke.

FIG. 3 shows the engine 50 when the piston 52 is at the beginning of an exhaust stroke. The piston 52 is at or near BDC, the intake valve 62 is closed, and the exhaust valve 64 is opened. Continued rotation of the crankshaft 56 moves the piston 52 up in the combustion chamber 54, driving the gases in the combustion chamber 54 out thorough the exhaust channel 68.

Figure 4:
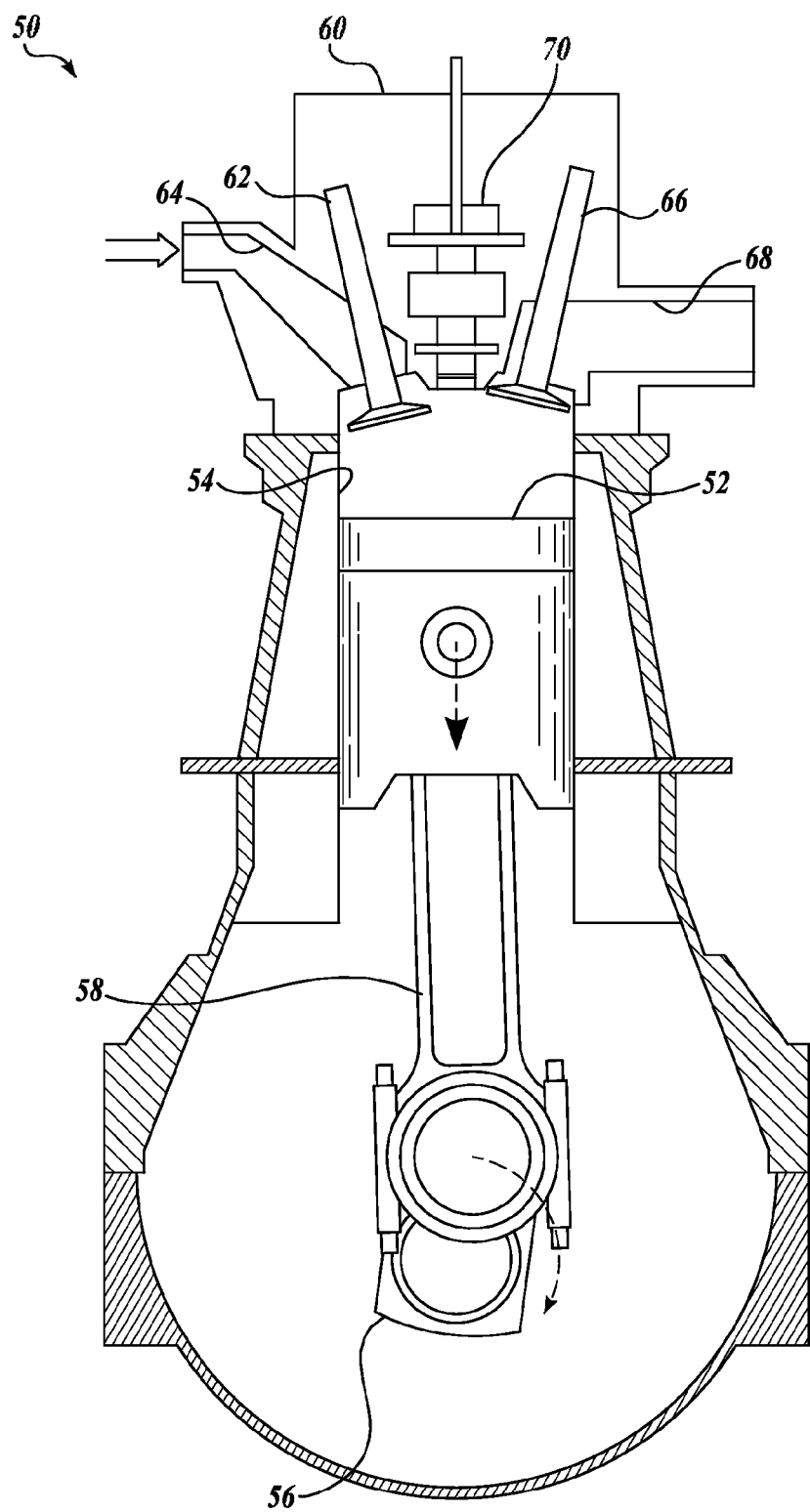
FIG. 4 depicts another schematic view of the engine of FIG. 1 when the piston is at the beginning of an intake stroke.

FIG. 4 shows the engine 50 when the piston 52 is at the beginning of an intake stroke. The piston 52 is at or near TDC, the exhaust valve 66 is closed, and the intake valve 62 is opened. Rotation of the crankshaft 56 drives the piston 52 downward in the combustion chamber 54, drawing air in through the intake channel 64. The piston continues downward until it reaches BDC, at which point the intake valve 62 closes and the engine 50 begins the combustion cycle again.

Figure 5:
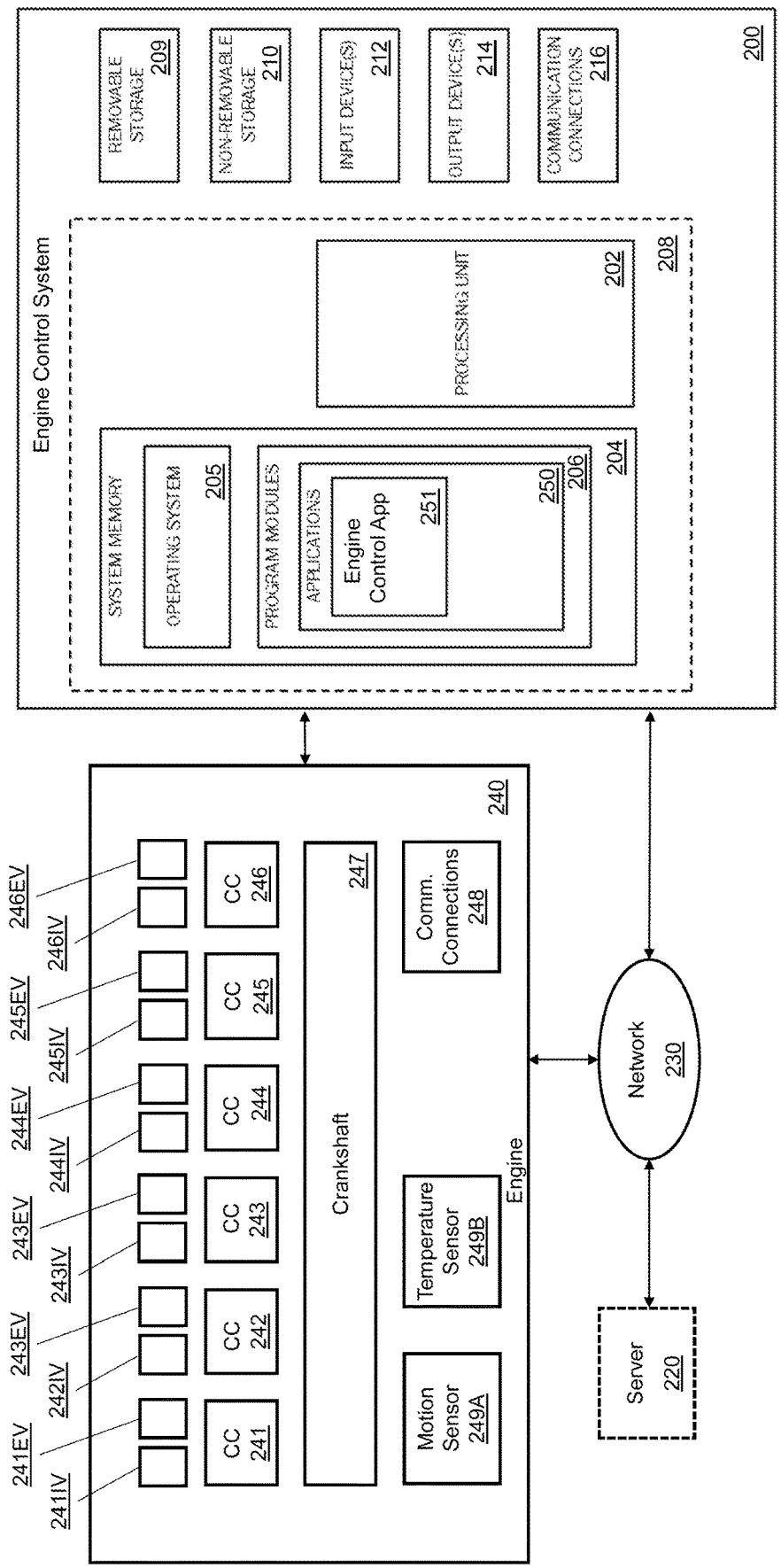
FIG. 5 depicts a block diagram illustrating components of an engine and of an engine control system.

FIG. 5 depicts a block diagram illustrating components (e.g., hardware and software) of an engine 240 and an engine control system 200. The engine 240 may be an engine (e.g., a diesel engine) of a vehicle (e.g., an automobile, such as a car, a trailer-truck, etc.). In some examples, the engine 240 is the engine 50 shown in FIGS. 1-4. The engine 240 may be a diesel engine, but the present disclosure is not limited thereto.

The engine control system 200 may be integrated in the vehicle. For example, the engine control system 200 may form a part (e.g., an integral part) of the engine 240, or the engine control system 200 may be an integral part of the vehicle while being separated from, and operatively connected to, the engine 240. The engine control system 200 may be communicatively coupled to the engine 240 such that signals (e.g., control signals or information signals) can be transmitted from the engine control system 200 to the engine 240 and from the engine 240 to the engine control system 200. For example, the engine control system 200 and the engine 240 may be communicatively coupled via a network 230, a wired connection, or a wireless connection, such as a Bluetooth connection, among other possibilities. The engine 240 and/or the engine control system 200 may be communicatively coupled to a server 220, for example, via the network 230. Server 220 may be used, e.g., to provide updates to the program modules 206 of the engine control system 200, including, e.g., over-the-air updates.

The engine 240 may include a crankshaft 247, one or more pistons pivotably coupled to the crankshaft 247, and one or more combustion chambers (CC) respectively corresponding to the one or more pistons. The one or more pistons may be configured to slide in and out of their corresponding combustion chambers, for example, in a manner similar to how the piston 52 in FIGS. 1-4 is configured to slide in and out of the combustion chamber 54. Each of the one or more combustion chambers of the engine 240 may be controllably coupled to an intake channel via an intake valve, and may be controllably coupled to an exhaust channel via an exhaust valve, for example, in a manner similar to how the combustion chamber 54 in FIGS. 1-4 is controllably coupled to the intake and exhaust channels 64 and 68 respectively via the intake and exhaust valves 62 and 66. The engine 240 may be configured to inject fuel into each of the one or more combustion chambers, for example, via one or more injectors respectively corresponding to the one or more combustion chambers.

The engine 240 may have, for example, 1, 2, 4, 6, 8, or more combustion chambers. In the nonlimiting and non-exhaustive example depicted in FIG. 5, the engine 240 includes six combustion chambers including a first combustion chamber 241, a second combustion chamber 242, a third combustion chamber 243, a fourth combustion chamber 244, a fifth combustion chamber 245, and a sixth combustion chamber 246. The first combustion chamber 241 may be controllably coupled to a corresponding intake channel via a first intake valve 241IV, and to a corresponding exhaust channel via a first exhaust valve 241EV. The second combustion chamber 242 may be controllably coupled to a corresponding intake channel via a second intake valve 242IV, and to a corresponding exhaust channel via a second exhaust valve 242EV. The third combustion chamber 243 may be controllably coupled to a corresponding intake channel via a third intake valve 243IV, and to a corresponding exhaust channel via a third exhaust valve 243EV. The fourth combustion chamber 244 may be controllably coupled to a corresponding intake channel via a fourth intake valve 244IV, and to a corresponding exhaust channel via a fourth exhaust valve 244EV. The fifth combustion chamber 245 may be controllably coupled to a corresponding intake channel via a fifth intake valve 245IV, and to a corresponding exhaust channel via a fifth exhaust valve 245EV. The sixth combustion chamber 246 may be controllably coupled to a corresponding intake channel via a sixth intake valve 246IV, and to a corresponding exhaust channel via a sixth exhaust valve 246EV.

In some examples, the engine 240 may also include at least one processor and a memory. The at least one processor of the engine 240 may be configured to control some operations of the engine 240 when executing computer-readable instructions stored in the memory of the engine 240. The engine 240 may include communication connections 248 configured to communicate with (e.g., configured to receive and/or transmit control and/or information signals) to the engine control system 200, for example, via the network 230. The engine 240 may include a motion sensor 249A configured to measure a rotational speed of the crankshaft 247 and/or a number of rotations of the crankshaft between two points of time, and to transmit one or more motion signals to the engine control system 200 with information about the measured rotational speed of the crankshaft 247 and/or with information about the measured number of rotations. The engine 240 may include a temperature sensor 249B configured to measure a temperature of the engine 240, for example, a first temperature of a first set of combustion chambers from among the combustion chambers of the engine 240 and/or a second temperature of a second set of combustion chambers from among the combustion chambers of the engine 240. One or more temperature sensor 249B may also measure ambient temperature outside the engine 240 and communicate such ambient temperature to engine control system 200. The engine 240 may be configured to transmit one or more temperature signals to the engine control system 200 with information about the temperature(s) measured by the temperature sensor 249B.

In a basic configuration, the engine control system 200 may include at least one processing unit 202 (e.g., at least one processor) and a system memory 204. Depending on the configuration and type of control system, the system memory 204 may include, but is not limited to, volatile storage (e.g., random access memory), non-volatile storage (e.g., read-only memory), flash memory, or any combination of such memories. The system memory 204 may include an operating system 205 and one or more program modules 206 suitable for running software applications 250 such as engine control applications 251. The engine control application 251 may include instructions that, when executed by the processing unit 202, cause the system to perform operations and processes described herein for controlling the engine 240 (e.g., during a process of starting the engine). In examples, the engine control application 251 may be implemented in hardware, software, firmware, or a combination thereof. Furthermore, aspects of the invention may be practiced in conjunction with a graphics library, a data library, other operating systems, or any other application program and is not limited to any particular application or system. This basic configuration is illustrated in FIG. 5 by those components within a dashed line 208. The engine control system 200 may have additional features or functionality. For example, the engine control system 200 may also include additional data storage devices (removable and/or non-removable) such as, for example, magnetic disks, optical disks, or tape. Such additional storage is illustrated in FIG. 5 by a removable storage device 209 and a non-removable storage device 210.

As stated above, a number of program modules and data files may be stored in the system memory 204. While executing on the processing unit 202, the program modules 206 may perform processes including, but not limited to, one or more of the stages or operations of the methods described herein.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components of the engine control system 200 illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. Examples of the present disclosure may also be practiced using other technologies capable of performing logical operations such as, for example, AND, OR, and NOT, including but not limited to mechanical, optical, fluidic, and quantum technologies. In addition, aspects of the invention may be practiced within a computer or in any other circuits or systems.

The engine control system 200 may also have one or more input device(s) 212 such as a keyboard, a mouse, a pen, a sound input device, a touch input device, etc. The engine control system 200 may include a display and may also include other output device(s) 214 such as speakers, etc. The aforementioned devices are examples and others may be used. The engine control system 200 may include one or more communication connections 216 allowing communications with other computing devices and/or with the engine 240. For example, the engine control system 200 and the engine 240 may communicate with each other via the communication connections 216 of the engine control system 200 and the communication connections 248 of the engine 240. Examples of suitable communication connections 216 and 248 include, but are not limited to, RF transmitter, receiver, and/or transceiver circuitry; universal serial bus (USB), parallel, serial ports, and/or controller area network connection systems and interfaces. The engine control system 200 (e.g., the processing unit 202) may be configured to transmit signals for controlling operations of the engine 240 via the communication connections 216 and 248. The engine control system 200 may be configured to receive signals, such as from the engine 240 or from other components of the vehicle, via the communication connections 216.

The term computer readable media as used herein may include computer storage media. Computer storage media may include volatile and nonvolatile, removable and non-removable media implemented in any method or technology for storage of information, such as computer readable instructions, data structures, or program modules. The system memory 204, the removable storage device 209, and the non-removable storage device 210 may all be computer storage media examples (i.e., memory storage). Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the engine control system 200. Any such computer storage media may be part of the engine control system 200. Computer storage media may be non-transitory and tangible and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6:
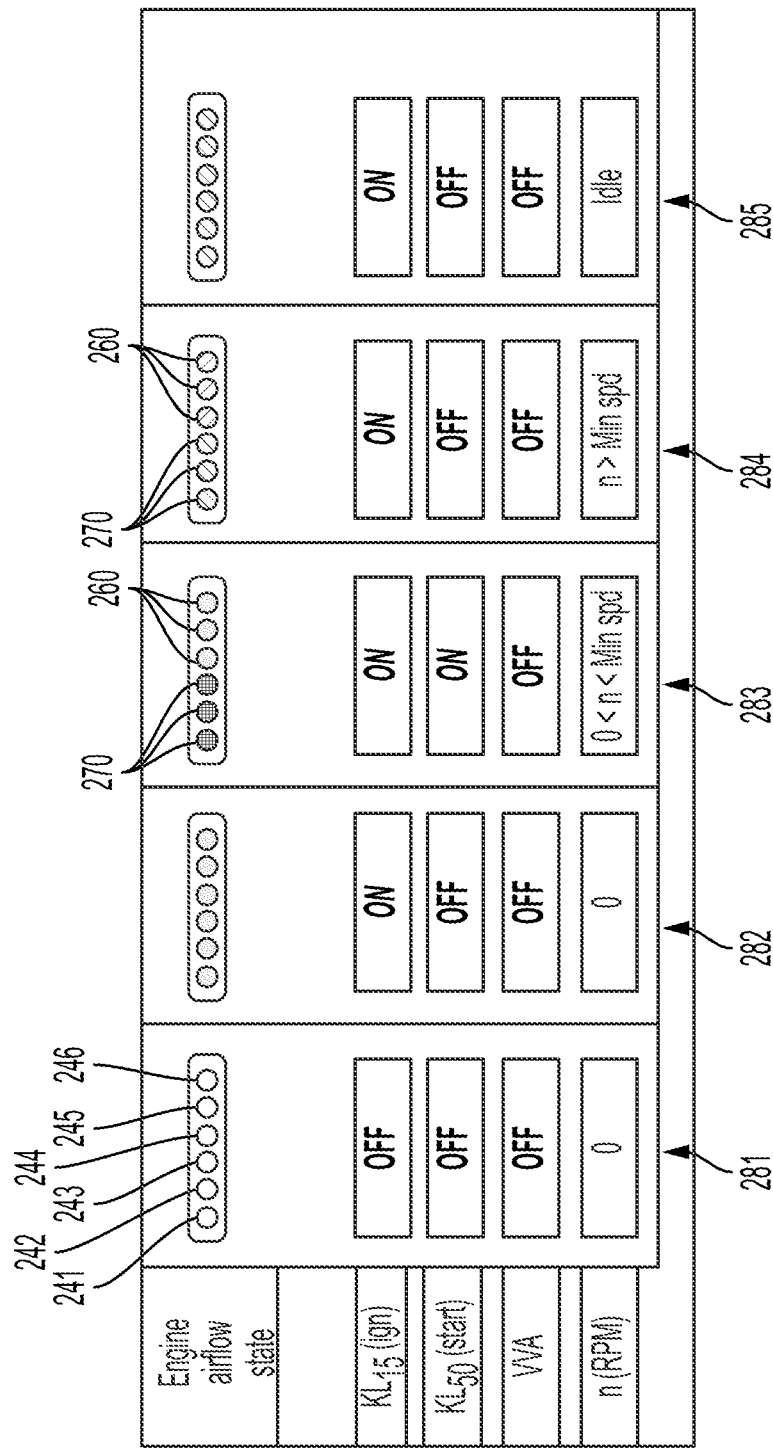
FIG. 6 depicts different stages of a start-up operation for starting the engine of FIG. 5 according to some examples.

FIG. 6 depicts different stages of a low-temperature start-up operation for starting the engine 240 of FIG. 5 according to some examples. The low-temperature start-up operation may be an operation for starting the engine 240 while a temperature of the engine 240 and/or of the atmosphere surrounding the vehicle is below a set temperature, for example, below 10° C., 0° C., -10° C., -20° C., -30° C., or -40° C. The low-temperature start-up operation may be configured to increase the temperature in at least part (e.g., in one or more of the first to sixth combustion chambers 241-246) of the engine 240 faster compared to when a normal start-up operation is used to start the engine 240. The higher temperature of the engine 240 can cause more fuel (e.g., diesel fuel) to evaporate in the engine 240 and, thus, increase the likelihood of internal combustion within the engine 240 when attempting to start the engine. An example of the normal start-up operation will be discussed in more detail hereinbelow. The low-temperature start-up operation can therefore reduce pollution, e.g., by reducing the likelihood that non-ignited fuel will be expelled from the engine 240, and may increase the efficiency of the engine 240.

In some examples, the engine control system 200 may be configured to selectively use the low-temperature start-up operation or the normal start-up operation to start the engine 240. For example, the engine control system 200 may start the engine 240 using the normal start-up operation as a default option, and may instead start the engine 240 using the low-temperature start-up operation when a temperature of the engine 240 and/or a temperature of the atmosphere around the vehicle is less than a set temperature, for example, less than 10° C., 0° C., -10° C., -20° C., -30° C., or -40° C.

For example, the engine control system 200 may receive a temperature signal from the temperature sensor 249B, and the processing unit 202 may be configured (when executing instructions stored in the system memory 204) to determine whether the temperature of the engine 240 is below the set temperature based on the temperature signal received from the temperature sensor 249B. In some other examples, the vehicle may include an exterior temperature sensor configured to measure a temperature of the environment around the vehicle and to transmit a temperature signal to the engine control system 200 with information about the temperature of the environment. The processing unit 202 may be configured (when executing instructions stored in the system memory 204) to determine whether the temperature of the environment is below the set temperature based on the temperature signal received from the exterior temperature sensor.

In a first stage 281 of the low-temperature start-up operation, the engine 240 may be in an off state, in which the crankshaft 247 does not rotate, and the intake and exhaust valves of the combustion chambers of the engine 240 do not move. In some examples, the intake and exhaust valves of each of the combustion chambers of the engine may both be in the closed position.

In a second stage 282 of the low temperature start-up operation, the crankshaft 247 may not rotate, and the processing unit 202 may be configured (when executing instructions stored in the system memory 204) to transmit one or more preliminary signals to the engine 240. The one or more preliminary signals may cause the exhaust valve (e.g., both the exhaust valve and the intake valve, or the exhaust valve without the intake valve) of each combustion chamber of the engine 240 to be held in the opened position during the second stage 282.

The processing unit 202 may be configured to transmit the one or more preliminary signals in response to the engine control system 200 receiving a vehicle start signal. The vehicle start signal may be transmitted, for example, by a chip, processing unit, or a microcontroller of the vehicle that is configured to transmit the vehicle start signal in response to a vehicle key being inserted into a key switch and turned to an ignition switch position (e.g., also known as a KL15 position). In some other examples, the vehicle start signal may be transmitted in response to, for example, a vehicle start button of the vehicle being pressed. In some other examples, the vehicle start signal may be wirelessly transmitted from a key fob or a controller device (e.g., a phone communicatively coupled to the engine control system 200).

In a third stage 283 of the low-temperature start-up operation, the processing unit 202 may be configured (when executing instructions stored in the system memory 204) to transmit one or more engine control signals to the engine 240. The one or more engine control signals may cause the crankshaft 247 to begin to rotate and to rotate through a first plurality of rotations, and to control movement of the exhaust and intake valves of the combustion chambers of the engine 240. In some examples, the one or more engine control signals cause an engine starter of the vehicle to controllably rotate the crankshaft 247. The first plurality of rotations of the crankshaft 247 may be 2 or more rotations, for example, 4, 10, 20, or 100 rotations.

The one or more engine control signals may cause, for each combustion chamber of a first set of combustion chambers 260 of the engine 240, the exhaust valve (e.g., the exhaust valve without the intake valve, or both the exhaust valve and the intake valve) to remain in an open position while the crankshaft 247 rotates through the first plurality of rotations. For example, the intake valve of the combustion chamber may also be caused to be kept in the opened position, or may be caused to be in the closed position, while the crankshaft 247 rotates through the first plurality of rotations. No fuel may be injected into the first set of combustion chambers 260 while the crankshaft 247 rotates through the first plurality of rotations. For example, the one or more engine control signals may not cause an injector of each combustion chamber of the first set of combustion chambers 260 to inject fuel into the combustion chamber. This mode of operating the first set of combustion chambers 260 during the third stage 283 may be referred to as a valve open mode of operation.

The one or more engine control signals may cause, for each combustion chamber of a second set of combustion chambers 270 of the engine 240, the exhaust and intake valves of the combustion chamber to open and close while the crankshaft 247 rotates through the first plurality of rotations. For example, the exhaust and intake valves of the second set of combustion chambers 270 may open and close as they normally do during a combustion cycle of the engine 240, for example, in a similar manner as the exhaust and intake valves 66 and 62 open and close during the combustion cycle illustrated and described with respect to FIGS. 1-4. In some examples, no fuel is injected into the combustion chambers of the second set of combustion chambers 270 while the crankshaft 247 rotates through the first plurality of rotations. For example, the one or more engine control signals may not cause an injector of each combustion chamber of the second set of combustion chambers 270 to inject fuel into the combustion chamber while the crankshaft 247 rotates through the first plurality of rotations. This mode of operating the second set of combustion chambers 270 during the third stage 283 may be referred to as a normal non-firing mode.

In some examples, the first set of combustion chambers 260 may include one or more combustion chambers from among the combustion chambers of the engine 240, and the second set of combustion chambers 270 may include the remaining combustion chambers from among the combustion chambers of the engine 240 that are not included in the first set of combustion chambers 260. In some examples, the first set of combustion chambers 260 include one-fourth, one-third, one-half, two-thirds, or three-fourths of the combustion chambers of the engine 240. In some examples, the first set of combustion chambers 260 includes 1, 2, 3, or 4 combustion chambers from among the combustion chambers of the engine 240. The combustion chambers of the first set of combustion chambers 260 may be combustion chambers whose corresponding pistons are configured to move in-phase with each other as the crankshaft 247 rotates. In some other examples, at least one combustion chamber of the first set of combustion chambers 260 has a corresponding piston configured to move out-of-phase from a piston corresponding to another combustion chamber of the first set of combustion chambers 260 as the crankshaft 247 rotates. In the nonlimiting and non-exhaustive example depicted, the engine 240 includes the first to sixth combustion chambers 241 to 246, the first set of combustion chambers 260 includes the fourth, fifth, and sixth combustion chambers 244, 245, and 246, and the second set of combustion chambers 270 includes the first, second, and third combustion chambers 241, 242, and 243.

By keeping the exhaust valves (and, in some examples, also the intake valves) of the first set of combustion chambers 260 open, while operating the exhaust and intake valves of the second set of combustion chambers 270 normally, during the third stage 283, a rotational acceleration of the crankshaft 247 and a temperature of the second set of combustion chambers 270 can both be higher than if the exhaust and intake valves for the first set of combustion chambers 260 were also operated normally (e.g., in the normal non-firing mode). In more detail, in the second set of combustion chambers 270, the corresponding pistons will perform work during the third stage 283 by compressing gases in the combustion chambers, thereby converting some rotational energy from the crankshaft 247 into heat in the second set of combustion chambers 270. In contrast, in the first set of combustion chambers 260, the corresponding pistons substantially perform no work during the third stage 283 because the exhaust valves of the first set of combustion chambers 260 are kept open, thereby preventing gas compression within the first set of combustion chambers 260. Rotational energy of the crankshaft 247 therefore is substantially not reduced by conversion into thermal energy in the first set of combustion chambers 260.

Accordingly, the crankshaft 247 can accelerate to a higher rotational speed and, thus, perform more work in the second set of combustion chambers 270 and raise the temperature in the second set of combustion chambers 70 to a higher temperature than if the first set of combustion chambers 260 were operated in the normal non-firing mode. This increased temperature in the second set of combustion chambers 270 can result in higher evaporation of diesel fuel when such fuel is eventually injected into the second set of combustion chambers 270, and can increase the likelihood that the injected fuel will ignite during the combustion cycle.

In some examples, the one or more engine control signals include a first set of one or more first engine control signals for controlling operations of the crankshaft 247 and of the combustion chambers (e.g., of the exhaust valves, intake valves, and injectors) of the engine 240 during the third stage 283, as described herein. The processing unit 202 may be configured to transmit the first set of one or more first engine control signals in response to the engine control system 200 receiving an engine start signal.

The engine start signal may be transmitted, for example, by a chip, processing unit, or a microcontroller in the vehicle that is configured to transmit the engine start signal in response to a vehicle key being inserted into a vehicle key switch and turned to a start switch position (e.g., also known as a KL50 position). In some other examples, the engine start signal may be transmitted in response to, for example, an engine start button of the vehicle being pressed. In some other examples, the engine start signal may be wirelessly transmitted by a key fob or a controller (e.g., a phone communicatively coupled to the engine control system 200).

In a fourth stage 284 of the low-temperature start-up operation, the one or more engine control signals may cause, for each combustion chamber of the second set of combustion chambers 270, fuel to be injected into the combustion chamber and ignited inside the combustion chamber. For example, an injection of fuel (e.g., diesel fuel) may be provided during each combustion cycle, such as in a manner similar to how the injector 70 injects fuel into the combustion chamber 54 during a combustion cycle as illustrated and described with respect to FIGS. 1-4. The one or more engine control signals may cause the intake and exhaust valves of the second set of combustion chambers 270 to move in a manner similar to how the intake and exhaust valves of the second set of combustion chambers 270 may be moved during the third stage 283, for example, as they are normally moved during a combustion cycle of the engine 240. This mode of operating the second set of combustion chambers 270 during the fourth stage 284 may be referred to as a normal firing mode.

During the fourth stage 284, the one or more engine control signals may cause, for each combustion chamber of the first set of combustion chambers 260, the exhaust and intake valves to both be in the closed position while the crankshaft 274 rotates through a second plurality of rotations, and to not inject fuel into the combustion chamber while the crankshaft 274 rotates through the second plurality of rotations. The second plurality of rotations may include 2 or more rotations, for example, 4, 10, 20, or 100 rotations. This mode of operating the first set of combustion chambers 260 during the fourth stage 284 may be referred to as a cylinder deactivation (CDA) mode.

Because a temperature of the second set of combustion chambers 270 may be relatively high, for reasons described in more detail above with reference to the third stage 283, a greater portion of the diesel fuel injected into the second set of combustion chambers 270 will evaporate, and there will be a higher likelihood that the diesel fuel will ignite during a combustion cycle (e.g., during a power stroke). Additionally, by operating the first set of combustion chambers 260 in the CDA mode during the fourth stage 284, the pistons associated with the first set of combustion chambers 260 can work to compress the gas in the first set of combustion chambers 260, thereby raising the temperature in the first set of combustion chambers 260 faster than if the first set of combustion chambers 260 were operated in the valve open mode. This can allow the first set of combustion chambers 260 to be operated in the normal firing mode in a shorter period of time.

The one or more engine control signals may include a second set of one or more second engine control signals for controlling operations of the combustion chambers (e.g., of the intake valves, the exhaust valves, and the injectors) of the engine 240 during the fourth stage 284 as described herein. For example, the processing unit 202 may be configured (when executing instructions stored in the system memory 204) to transmit the second set of one or more engine control signals in response to determining that the crankshaft 247 has rotated through the first plurality of rotations, that a rotational speed of the crankshaft 247 has exceeded a threshold speed, and/or that a temperature of the second set of combustion chambers 270 has exceeded a first threshold temperature. The processing unit 202 may be configured to determine whether the rotational speed of the crankshaft 247 has rotated through the first plurality of rotations and/or has exceeded the threshold speed based on a motion signal received from the motion sensor 249A, and may be configured to determine whether the temperature of the second set of combustion chambers 270 has exceeded the first threshold temperature based on a temperature signal received from the temperature sensor 249B.

In a fifth stage 285 of the low-temperature start-up operation, the one or more engine control signals may cause fuel to be injected into all of the combustion chambers of the engine 240, and to move the exhaust and intake valves of each of the combustion chambers of the engine 240 between opened and closed position while the crankshaft 247 rotates. For example, the one or more engine control signals may cause all of the combustion chambers of the engine 240 to be operated in the normal firing mode during the fifth stage 285.

The one or more engine control signals may include a third set of one or more third engine control signals for controlling operations of the combustion chambers (e.g., of the intake valves, the exhaust valves, and the injectors) of the engine 240 during the fifth stage 285, as described herein. The processing unit 202 may be configured (when executing instructions stored in the system memory 204) to transmit the third set of one or more third engine control signals in response to determining that the crankshaft 247 has rotated through the second plurality of rotations, that a temperature of the first set of combustion engines 260 has exceeded a second threshold temperature, and/or that a set period of time has passed from when the first set of combustion chambers 260 began to be operated in the CDA mode. The processing unit 202 may be configured to determine whether the crankshaft 247 has rotated through the second plurality of rotations based on a motion signal received from the motion sensor 249A, may be configured to determine whether the temperature of the first set of combustion chambers 260 has exceeded the second threshold temperature based on a temperature signal received from the temperature sensor 249B, and/or may determine whether the set period of time has passed based on an internal clock of the engine control system 200.

In some examples, a first amount of fuel injected into each of the second set of combustion chambers 270 during the fourth stage 284, in which they first set of combustion chambers 260 are not firing, may be greater than a second amount of fuel injected into the second set of combustion chambers 270 during the fifth stage 285, in which the first set of combustion chambers 260 are firing. For example, the first amount of fuel may be between 1 and 2 times the second amount of fuel. The higher amount of fuel provided to the second set of combustion chambers 270 during the fourth stage 284 may enable more work to be performed on the pistons associated with the second set of combustion chambers 270 to compensate for no work being performed on the pistons associated with the first set of combustion chambers 260 during the fourth stage 284. The higher amount of fuel can also increase the total amount of evaporated diesel fuel in the second set of combustion chambers 270 and, thus, make ignition more likely to occur.

In some examples, variable valve actuation (VVA) may not be used during the low-temperature start-up operation.

Figure 7:
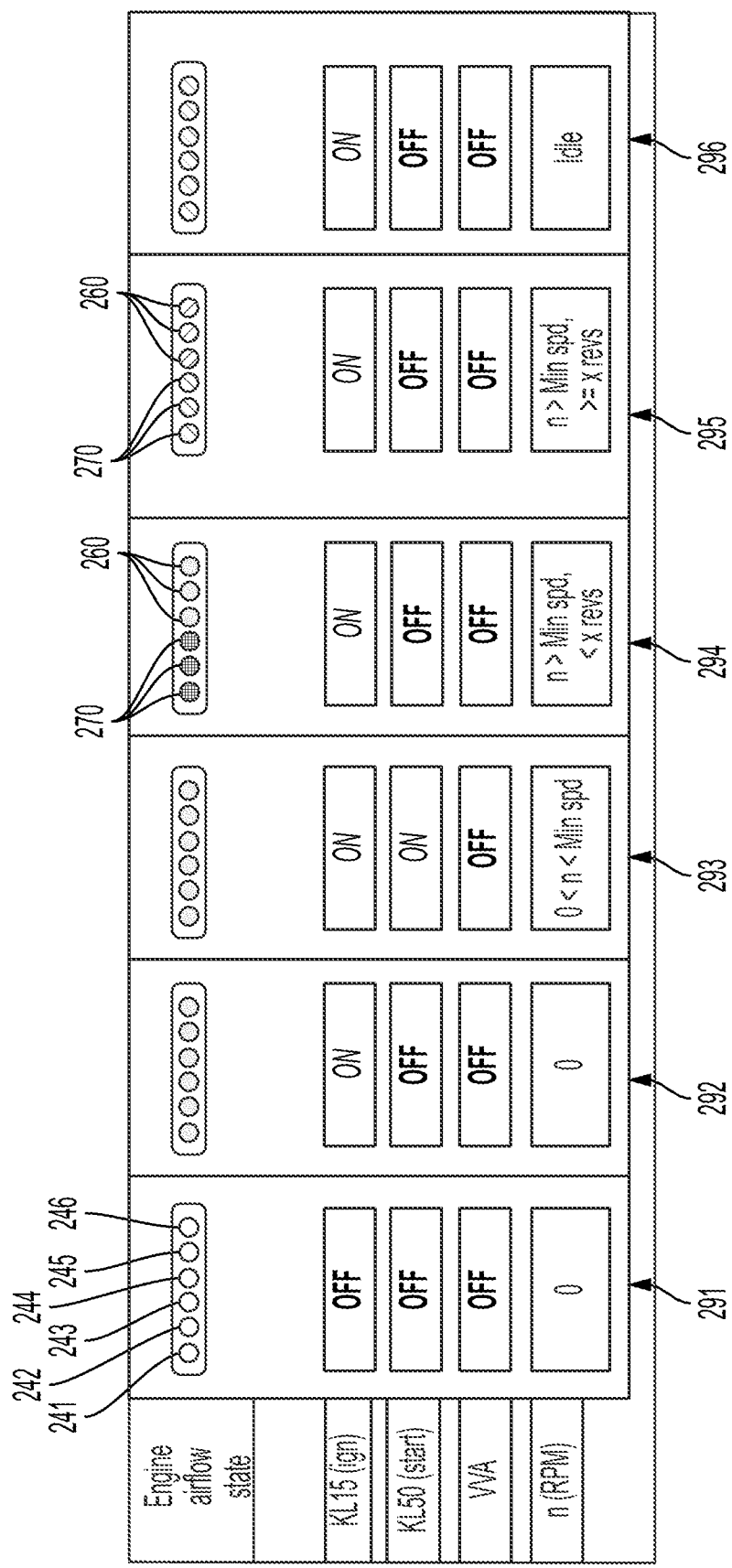
FIG. 7 depicts different stages of another start-up operation for starting the engine of FIG. 5 according to some examples.

FIG. 7 depicts different stages of another low-temperature start-up operation for starting the engine of FIG. 5 according to some examples. Some features of the low-temperature start-up operation of FIG. 7 may be similar to, or the same as, features of the low-temperature start-up operation of FIG. 6 and, thus, redundant descriptions may not be repeated.

Referring to FIG. 7, the low-temperature start-up operation may include a first stage 291, a second stage 292, a third stage 293, a fourth stage 294, a fifth stage 295, and a sixth stage 296. The first and second stages 291 and 292 of FIG. 7 may respectively be similar to the first and second stages 281 and 282 of FIG. 6.

The third stage 293 of FIG. 7 may be similar to the third stage 283 of FIG. 6, except that all of the combustion chambers of the engine 240 are operated in the valve open mode during the third stage 293 of FIG. 7. During the third stage 293, the processing unit 202 may be configured (when executing instructions stored in the system memory 204) to transmit one or more engine control signals to cause the crankshaft 247 to begin to rotate and to rotate through a first plurality of rotations, and to control movement of the exhaust and intake valves of the combustion chambers of the engine 240. The one or more engine control signals may cause, for each combustion chamber of the engine 240, the exhaust valve (e.g., both the exhaust valve and the intake valve, or the exhaust valve without the intake valve) to remain in the open position while the crankshaft 247 rotates through the first plurality of rotations and until a rotational speed of the crankshaft 247 exceeds a threshold speed.

For example, the one or more engine control signals may include a first set of one or more first engine control signals for controlling operations of the crankshaft and of the combustion chambers (e.g., of the exhaust valves, the intake valves, and the injectors) of the engine 240 during the third stage 283 as described herein. The processing unit 202 may be configured (when executing instructions stored in the system memory 204) to transmit the first set of one or more first engine control signals in response to receiving an engine start signal.

The fourth stage 294 of FIG. 7 may also be similar to the third stage 283 of FIG. 6. During the fourth stage 294, the one or more engine control signals may cause, while the crankshaft 247 rotates through a second plurality of rotations from when the fourth stage 294 begins, the first set of combustion chambers 260 to operate in the valve open mode and the second set of combustion chambers 270 to operate in the normal non-firing mode in a manner similar to how the first and second sets of combustion chambers 260 and 270 are operated in the third stage 283 of FIG. 6.

For example, the one or more engine control signals may include a second set of one or more second engine control signals for controlling operations of the crankshaft and of the combustion chambers (e.g., of the exhaust valves, the intake valves, and the injectors) during the fourth stage 294 as described herein. The processing unit 202 may be configured to generate the second set of one or more second engine control signals in response to determining (e.g., based on information received by the motion sensor 249A) that the crankshaft 247 has rotated through the first plurality of rotations and/or has attained a rotational speed exceeding a threshold speed.

The fifth stage 295 of FIG. 7 may be similar to the fourth stage 284 of FIG. 6. During the fifth stage 295, the one or more engine control signals may cause the first set of combustion chambers 260 to operate in the CDA mode, and to cause the second set of combustion chambers 270 to operate in the normal firing mode.

For example, the one or more engine control signals may include a third set of one or more third engine control signals for controlling operations of the combustion chambers of the engine 240 during the fifth stage 295 as described herein. The processing unit 202 (when executing instructions stored in the system memory 204) may be configured to transmit the third set of one or more third engine control signals in response to determining (e.g., based on information received from the motion sensor 249A and/or information received from the temperature sensor 249B) that the crankshaft 247 has rotated through the second plurality of rotations, that the crankshaft 247 has rotated through a set total number of rotations from when the crankshaft 247 began to rotate in the third stage 243, and/or that a temperature of the second set of combustion chambers 270 has exceeded a first temperature threshold.

The sixth stage 296 of FIG. 7 may be similar to the fifth stage 285 of FIG. 6. During the sixth stage 296, the one or more engine control signals may cause all of the combustion chambers of the engine 240 to be operated in the normal firing mode.

For example, the one or more engine control signals may include a fourth set of one or more fourth engine control signals for controlling operations of the combustion chambers (e.g., of the intake valves, the exhaust valves, and the injectors) of the engine 240 during the sixth stage 296. The processing unit 202 may be configured (when executing instructions stored in the system memory 204) to transmit the fourth set of one or more fourth engine control signals in response to determining (e.g., based on an internal clock of the engine control system 200, information received by the engine control system 200 from the motion sensor 249A, and/or information received by the engine control system 200 from the temperature sensor 249B) that a set time has passed from when the first set of combustion chambers 260 began to be operated in the CDA mode in the fifth stage 295, that a temperature of the first set of combustion chambers 260 has exceeded a second threshold temperature, and/or that the crankshaft 247 has rotated through a set number of rotations from when the first set of combustion chambers 260 began to be operated in the CDA mode or from when the crankshaft 247 began to rotate.

By operating all of the combustion chambers of the engine 240 in the valve open mode during the third stage 293 before respectively operating the first and second sets of combustion chambers 260 and 270 in the valve open mode and the normal non-firing mode in the fourth stage 294, a rotational acceleration of the crankshaft 247 may be greater than if the third stage 293 was omitted. The rotational momentum of the crankshaft 247 attained during the third stage 293 can then be utilized to more quickly increase the temperature of the second set of combustion chambers 270 when they are operated in the normal non-firing mode in the fourth stage 294.

Figure 8:
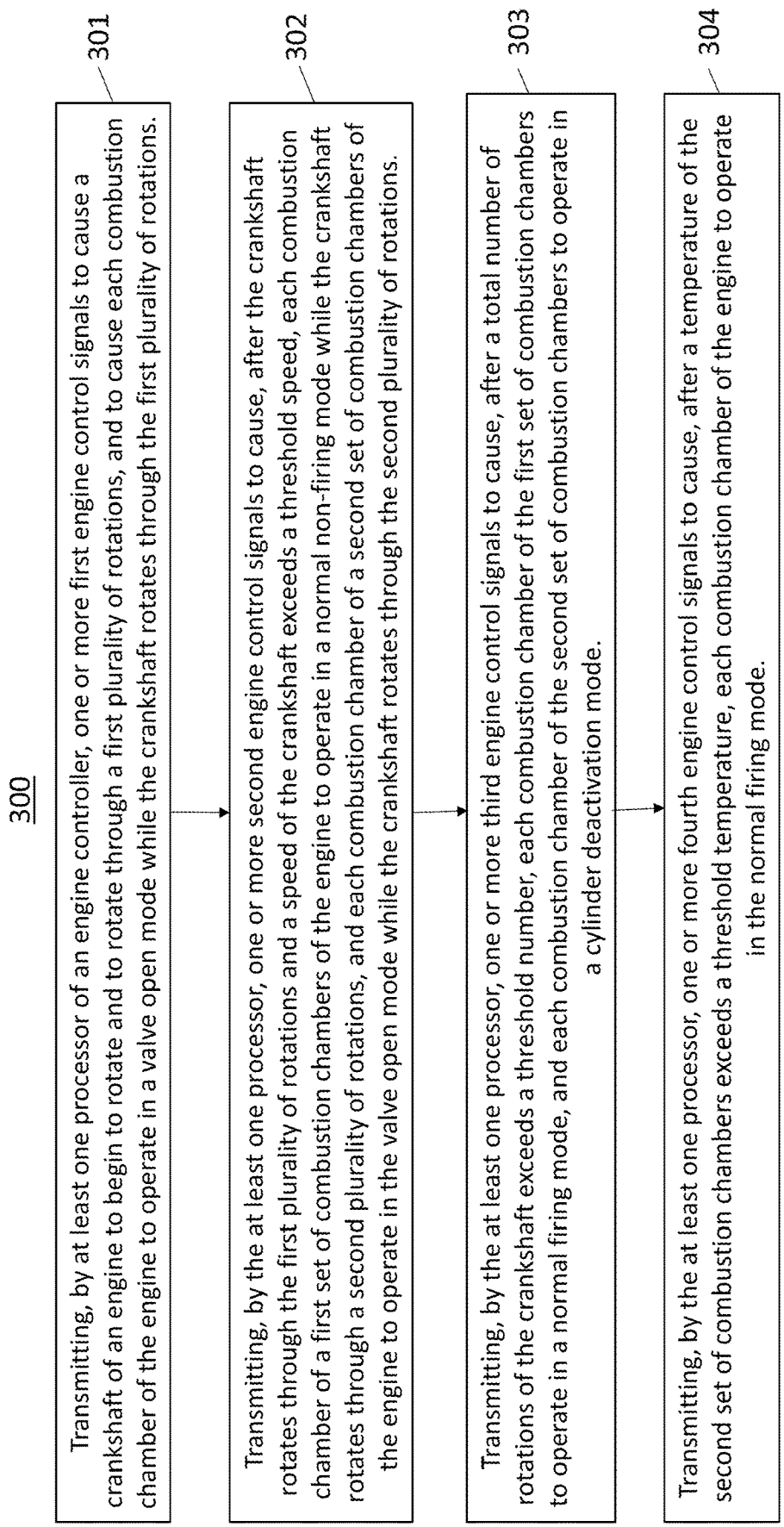
FIG. 8 depicts processes of a method for starting an engine according to some examples.

FIG. 8 depicts processes of a method 300 for starting an engine according to some examples. The method of FIG. 8 may be performed, for example, utilizing the engine control system 200 according to any suitable examples thereof within the scope of the present disclosure, and the engine may be, for example, any engine described in the present disclosure.

Referring to FIG. 8, the method 300 may include a first process 301 of transmitting, by at least one processor of an engine controller (e.g., the engine control system 200), one or more first engine control signals to cause a crankshaft of an engine to begin to rotate and to rotate through a first plurality of rotations, and to cause each combustion chamber of the engine to operate in a valve open mode while the crankshaft rotates through the first plurality of rotations. The valve open mode may be a mode of operation in which the exhaust valve (and, in some examples, also the intake valve) of the combustion chamber is kept open during a combustion cycle, and no fuel is injected into the combustion chamber.

The method 300 may include a second process 302 of transmitting, by the at least one processor, one or more second engine control signals to cause, after the crankshaft rotates through the first plurality of rotations and a speed of the crankshaft exceeds a threshold speed, each combustion chamber of a first set of combustion chambers of the engine to operate in a normal non-firing mode while the crankshaft rotates through a second plurality of rotations, and each combustion chamber of a second set of combustion chambers of the engine to operate in the valve open mode while the crankshaft rotates through the second plurality of rotations. The normal non-firing mode may be a mode of operation in which the intake and exhaust valves of the combustion chamber open and close during a combustion cycle, and no fuel is injected into the combustion chamber.

The method 300 may include a third process 303 of transmitting, by the at least one processor, one or more third engine control signals, to cause, after a total number of rotations of the crankshaft exceeds a threshold number, each combustion chamber of the first set of combustion chambers to operate in a normal firing mode, and each combustion chamber of the second set of combustion chambers to operate in a cylinder deactivation mode. The normal firing mode may be a mode of operation in which the intake and exhaust valves of the combustion chamber open and close during a combustion cycle, and fuel is injected into and ignited within the combustion chamber during the combustion cycle. The cylinder deactivation mode may be a mode of operation in which the intake and exhaust valves of the combustion chamber are kept close during a combustion cycle, and no fuel is injected into the combustion chamber.

The method 300 may include a fourth process 304 of transmitting, by the at least one processor, one or more fourth engine control signals to cause, after a temperature of the second set of combustion chambers exceeds a threshold temperature, each combustion chamber of the engine to operate in the normal firing mode.

FIG. 9 depicts processes of a method 400 for starting an engine according to some examples. The method of FIG. 9 may be performed, for example, with an engine system including the engine 240 and the engine control system 200 according to any suitable examples thereof within the scope of the present disclosure.

The method 400 may include a first process 401 of transmitting, by at least one processor of an engine controller (e.g., the engine control system 200), one or more first engine control signals that, when received by an engine, cause a crankshaft of the engine to begin to rotate and to rotate through a first plurality of rotations, cause each combustion chamber of a first set of combustion chambers of the engine to be operated in a valve open mode while the crankshaft rotates through the first plurality of rotations, and cause each combustion chamber of a second set of combustion chambers of the engine to be operated in a normal non-firing mode while the crankshaft rotates through the first plurality of rotations. The valve open mode may be a mode of operation in which the exhaust valve (and, in some examples, also the intake valve) of the combustion chamber is kept open during a combustion cycle, and no fuel is injected into the combustion chamber. The normal non-firing mode may be a mode of operation in which the intake and exhaust valves of the combustion chamber open and close during a combustion cycle, and no fuel is injected into the combustion chamber.

The method 400 may include a second process 402 of transmitting, by the at least one processor and after a rotational speed of the crankshaft exceeds a threshold speed, one or more second engine control signals that, when received by the engine, cause each combustion chamber of the first set of combustion chambers to be operated in a cylinder deactivation mode while the crankshaft rotates through a second plurality of rotations, and cause each combustion chamber of the second set of combustion chambers to operate in a normal firing mode. The normal firing mode may be a mode of operation in which the intake and exhaust valves of the combustion chamber open and close during a combustion cycle, and fuel is injected into and ignited within the combustion chamber during the combustion cycle. The cylinder deactivation mode may be a mode of operation in which the intake and exhaust valves of the combustion chamber are kept close during a combustion cycle, and no fuel is injected into the combustion chamber.

The method 400 may include a third process 403 of transmitting, by the at least one processor and after a temperature of the engine exceeds a temperature threshold, one or more third engine control signals that, when received by the engine, cause each combustion chamber of the engine to be operated in a normal firing mode.

Although some methods for starting an engine have been described with reference to FIGS. 8 and 9, the present disclosure is not limited thereto. Engine control systems for starting an engine, and processes performed by such engine control systems, have been described herein with reference to FIGS. 5-7, and the present disclosure includes all methods for starting an engine that include any combination of such processes in any suitable order.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. An engine control system for a vehicle, comprising:
   at least one processor; and
   a memory, operatively connected to the at least one processor and storing instructions that, when executed by the at least one processor and in response to receiving an engine start signal, cause the engine control system to perform a method, the method comprising:
   causing a crankshaft of an engine of the vehicle to begin to rotate and to rotate through a first plurality of rotations, and
   causing, for each of a first set of combustion chambers of the engine, an exhaust valve of the combustion chamber to remain in an opened position while the crankshaft rotates through the first plurality of rotations and prior to fuel being injected into the combustion chamber, and
   causing, for each of a second set of combustion chambers of the engine, the exhaust valve of the combustion chamber to open and close while the crankshaft rotates through the first plurality of rotations and prior to fuel being injected into the combustion chamber.

2. The engine control system of claim 1, wherein the method further comprises causing, after a speed of the crankshaft exceeds a threshold speed and for each of the first set of combustion chambers of the engine, the exhaust valve of the combustion chamber and an intake valve of the combustion chamber to both be closed while the crankshaft rotates through a second plurality of rotations and prior to fuel being injected into the combustion chamber.

3. The engine control system of claim 2, wherein the method further comprises causing, for each of the second set of combustion chambers of the engine and while the crankshaft rotates through the second plurality of rotations, fuel to be injected into the combustion chamber and ignited inside the combustion chamber.

4. The engine control system of claim 1, wherein the first plurality of rotations comprises 10 or more rotations.

5. The engine control system of claim 1, wherein the method comprises transmitting, by the at least one processor, one or more engine control signals to control the crankshaft and the exhaust valve of each of the first set of combustion chambers.

6. The engine control system of claim 1, wherein the method comprises causing, for each of the first set of combustion chambers, an intake valve of the combustion chamber to remain in a closed position while the crankshaft rotates through the first plurality of rotations.

7. An engine control system, comprising:
at least one processor; and
a memory, operatively connected to the at least one processor and storing instructions that, when executed by the at least one processor, cause the engine control system to perform a method, the method comprising transmitting, by the at least one processor, one or more engine control signals to:
- cause a crankshaft of an engine to rotate through a first plurality of rotations, and
- cause, for each of a first set of combustion chambers of the engine, an exhaust valve of the combustion chamber to remain in an opened position while the crankshaft rotates through the first plurality of rotations and without fuel being injected into the combustion chamber, and
- cause, for each of a second set of combustion chambers of the engine, the exhaust valve of the combustion chamber to open and close while the crankshaft rotates through the first plurality of rotations and prior to fuel being injected into the combustion chamber.

8. The engine control system of claim 7, wherein the method comprises the at least one processor transmitting the one or more engine control signals in response to receiving an engine start signal.

9. The engine control system of claim 7, wherein the one or more engine control signals cause:
- after a speed of the crankshaft exceeds a threshold speed and for each of the first set of combustion chambers, the exhaust valve of the combustion chamber and an intake valve of the combustion chamber to remain closed while the crankshaft rotates through a second plurality of rotations; and
- while the crankshaft rotates through the second plurality of rotations and for each of the second set of combustion chambers, fuel to be injected into the combustion chamber and ignited inside the combustion chamber.

10. The engine control system of claim 9, wherein the one or more engine control signals cause, after the crankshaft rotates through the second plurality of rotations and for each combustion chamber of the engine, fuel to be injected into the combustion chamber of the engine and ignited inside the combustion chamber.

11. An engine control system for a vehicle, comprising:
at least one processor; and
a memory, operatively connected to the at least one processor and storing instructions that, when executed by the at least one processor, cause the engine control system to perform a method, the method comprising transmitting, by the at least one processor, one or more engine control signals to:
- cause a crankshaft of an engine of the vehicle to begin to rotate and to rotate through a first plurality of rotations, and
- cause, for each of a first set of combustion chambers of the engine, a valve of the combustion chamber to remain in an opened position while the crankshaft rotates through the first plurality of rotations,
- cause, for each of a second set of combustion chambers of the engine, a valve of the combustion chamber to open and close while the crankshaft rotates through the first plurality of rotations and prior to fuel being injected into the combustion chamber.

12. The engine control system of claim 11, wherein the one or more engine control signals do not cause fuel to be injected into each of the first set of combustion chambers while the crankshaft rotates through the first plurality of rotations.

13. The engine control system of claim 11, wherein the one or more engine control signals cause:
- after the crankshaft rotates through the first plurality of rotations and for each of the first set of combustion chambers, the valve of the combustion chamber to remain open while the crankshaft rotates through a second plurality of rotations and prior to fuel being injected into the combustion chamber; and
- for each of the second set of combustion chambers, a valve to open and close while the crankshaft rotates through the second plurality of rotations and prior to fuel being injected into the combustion chamber.

14. The engine control system of claim 11, wherein the valve is an exhaust valve.

15. The engine control system of claim 14, wherein the one or more engine control signals cause, for each of the first set of combustion chambers, an intake valve of the combustion chamber to remain in an opened position while the crankshaft rotates through the first plurality of rotations.

* * * * *